(12) United States Patent
Linskens et al.

(10) Patent No.: US 8,132,500 B2
(45) Date of Patent: Mar. 13, 2012

(54) HUMIDITY CONTROLLED FOOD WARMING CABINET

(75) Inventors: Michael Peter Linskens, Delafield, WI (US); Richard Allen Guindon, Jr., Pewaukee, WI (US)

(73) Assignee: Illinois Tool Works Inc., Glenview, IL (US)

( * ) Notice: Subject to any disclaimer, the term of this patent is extended or adjusted under 35 U.S.C. 154(b) by 981 days.

(21) Appl. No.: 12/062,836

(22) Filed: Apr. 4, 2008

(65) Prior Publication Data

US 2009/0249963 A1 Oct. 8, 2009

(51) Int. Cl.
*A47J 27/04* (2006.01)
*A21B 1/26* (2006.01)
*F27D 7/02* (2006.01)

(52) U.S. Cl. ............ 99/473; 99/467; 99/468; 126/21 A; 219/401

(58) Field of Classification Search .................... 99/473, 99/474, 475, 467, 487; 219/401, 400; 126/21 A
See application file for complete search history.

(56) References Cited

U.S. PATENT DOCUMENTS

| | | | |
|---|---|---|---|
| 3,952,609 A | 4/1976 | Klemm | |
| 4,623,780 A | 11/1986 | Shelton | |
| 4,635,540 A | 1/1987 | Dowds | |
| 4,646,630 A | 3/1987 | McCoy et al. | |
| 4,722,268 A | 2/1988 | Rightley | |
| 4,727,801 A | 3/1988 | Yokoi et al. | |
| 4,817,582 A * | 4/1989 | Oslin et al. ................... | 126/21 A |
| 4,835,368 A | 5/1989 | Fortmann et al. | |
| 4,891,498 A | 1/1990 | Fortmann et al. | |
| 4,920,948 A | 5/1990 | Koether et al. | |
| 4,924,072 A | 5/1990 | Oslin | |
| 5,025,132 A | 6/1991 | Fortmann et al. | |
| 5,132,520 A * | 7/1992 | Blanton et al. ................. | 219/400 |
| 5,365,039 A | 11/1994 | Chaudoir | |
| 5,494,690 A | 2/1996 | Shelton | |
| 5,771,789 A | 6/1998 | Davis | |
| 5,947,197 A | 9/1999 | Lee et al. | |
| 6,121,583 A * | 9/2000 | Hansen ......................... | 219/401 |
| 6,384,380 B1 | 5/2002 | Faries, Jr. et al. | |
| 6,435,078 B1 | 8/2002 | Batten et al. | |

(Continued)

FOREIGN PATENT DOCUMENTS

EP 1310742 3/2004
(Continued)

OTHER PUBLICATIONS

"Installation and Operating Instructions for the moisture+", pp. 1-35, Part #1936601 Rev. 5 (Apr. 2007), copyright 2005 Garland Commercial Industries, Inc.

*Primary Examiner* — Reginald L Alexander
(74) *Attorney, Agent, or Firm* — Levenfeld Pearlstein, LLC

(57) ABSTRACT

A humidified food warming apparatus is disclosed having a cabinet, a humidity sensor configured to measure a humidity level in the cabinet and a temperature sensor configured to measure a temperature level in the cabinet. A humidity and a temperature controller is also included. A warming element warms the cabinet as well as a warming element cover configured to rest adjacent to the warming element. A water dispensing device controllably releases a quantity of water onto the warming element cover when the humidity sensor senses that the humidity level within the cabinet has decreased and when the warming element cover is sufficiently warm to evaporate the quantity of water released onto the warming element cover.

12 Claims, 4 Drawing Sheets

U.S. PATENT DOCUMENTS

| | | |
|---|---|---|
| 6,497,907 B2 * | 12/2002 | Hofer .................. 426/233 |
| 6,658,994 B1 | 12/2003 | McMillan |
| 6,766,796 B2 | 7/2004 | Franzolin et al. |
| 6,894,252 B2 * | 5/2005 | Paller et al. .............. 219/400 |
| D521,309 S | 5/2006 | Carlini |
| 7,192,272 B2 | 3/2007 | Jones et al. |
| 2003/0079736 A1 | 5/2003 | Franzolin et al. |
| 2004/0261632 A1 | 12/2004 | Hansen et al. |
| 2005/0103205 A1 | 5/2005 | Franzolin |
| 2007/0125319 A1 | 6/2007 | Jones et al. |

FOREIGN PATENT DOCUMENTS

| | | |
|---|---|---|
| EP | 0959305 | 8/2004 |
| EP | 1530902 | 5/2005 |
| EP | 1536184 | 6/2005 |
| EP | 1655544 | 5/2006 |
| EP | 1672228 | 6/2006 |
| EP | 1715253 | 10/2006 |
| EP | 1721525 | 11/2006 |
| EP | 1726835 | 11/2006 |
| EP | 1726886 | 11/2006 |

* cited by examiner

HUMIDITY CONTROLLED FOOD WARMING CABINET

BACKGROUND OF THE INVENTION

The present invention is directed to a humidification cabinet. More particularly, the present invention pertains to an apparatus to humidify a food storage and warming cabinet.

Food storage and warming cabinets are common in the restaurant and catering businesses. Typically, food warming cabinets are used after food has been prepared to maintain the food at a desired temperature in a ready-to-serve condition. The plates or trays of food are held on shelves within an enclosed warming cabinet to await distribution. The cabinet may also be used to transport the prepared food from a preparation area to a distribution area. Typically, the food warming cabinet is maintained at a desired temperature with a warming element while a fan distributes the heat throughout the cabinet. Frequent opening and closing of the cabinet door to remove food plates and trays, however, can result in the heat from the cabinet escaping; as such, temperature regulators are also often included in food warming cabinets.

The food in food warming cabinets, however, can become dry due to prolonged exposure to the dry heat in the cabinets. To compensate, water is known to be sprayed through a fan into the cabinet to humidify the air. Unfortunately, with this approach, the food can become unduly damp or soggy. In another method, water is placed in a tray or basin in the bottom of the cabinet and the water is boiled with a second heating element to add moisture to the air. Unfortunately, not only is a second heating element required for this method, but the excess warm water in the open basin in the bottom of the cabinet can create a breeding ground for fungi, bacteria, and viruses, and may lead to the food becoming contaminated.

Accordingly, there is a need for a humidified food warming cabinet that prevents food from drying out and also prevents the accumulation of open water within the cabinet to inhibit contaminant growth within the cabinet.

BRIEF SUMMARY OF THE INVENTION

A humidified food warming apparatus is disclosed having a cabinet, a humidity sensor configured to measure a humidity level in the cabinet and a temperature sensor configured to measure a temperature level in the cabinet. A humidity and a temperature controller is also included. A warming element warms the cabinet as well as a warming element cover configured to rest adjacent to the warming element. A water dispensing device controllably releases a quantity of water onto the warming element cover when the humidity sensor senses that the humidity level within the cabinet has decreased and when the warming element cover is sufficiently warm to evaporate the quantity of water released onto the warming element cover.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
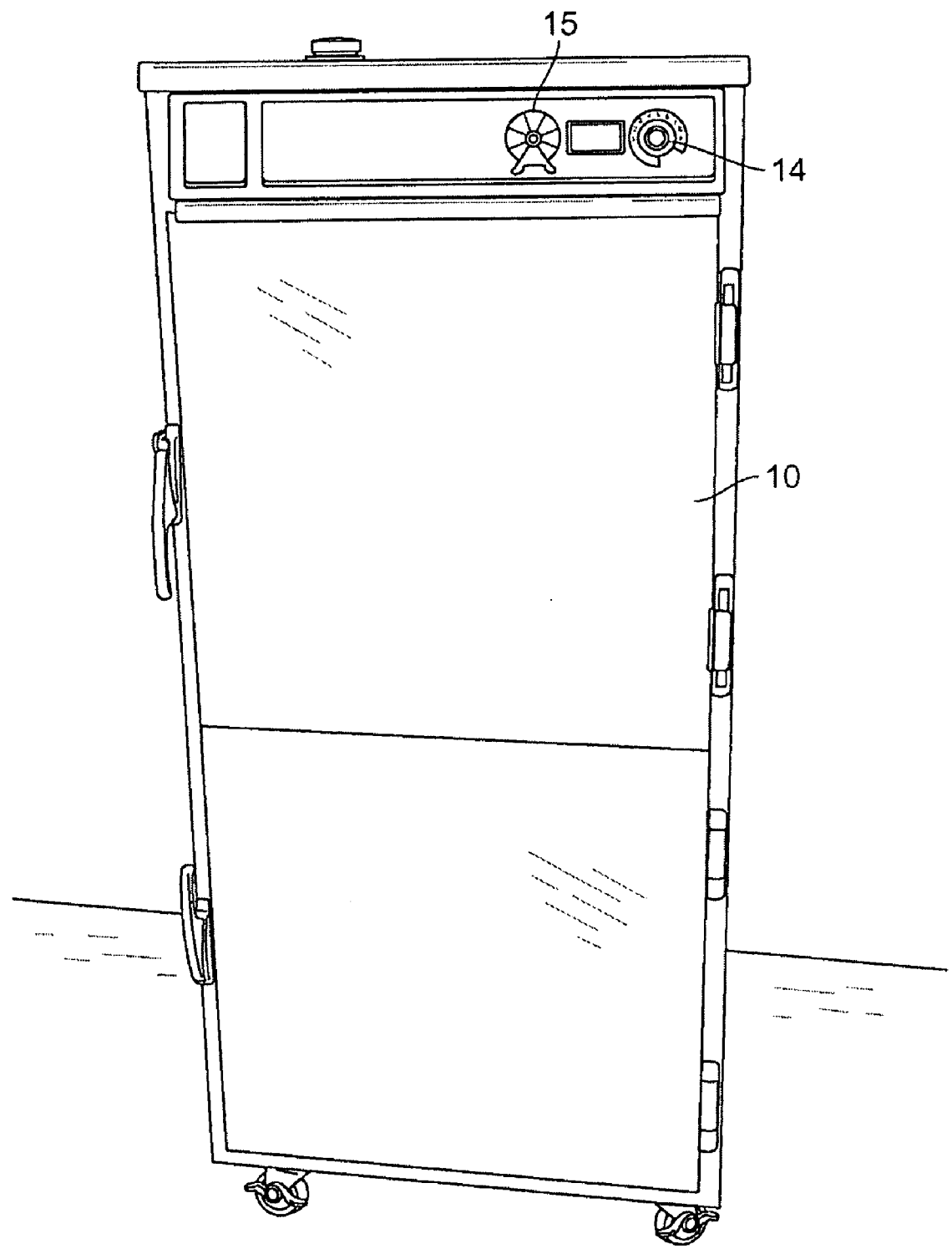
FIG. 1 is a perspective view of a food warming cabinet in accordance with the present disclosure.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Figure 2:
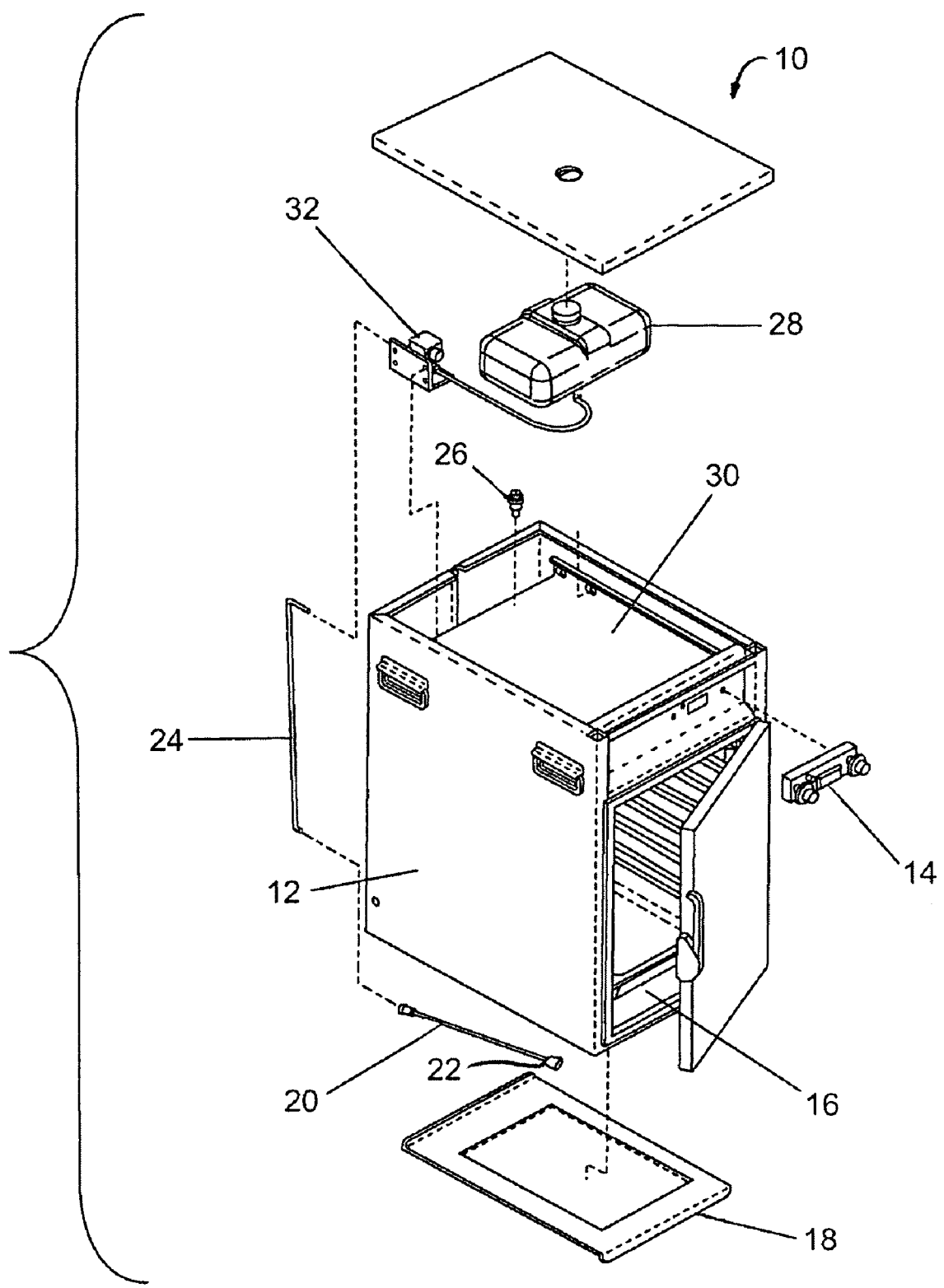
FIG. 2 is an exploded view of the food warming cabinet.

Referring now to the figures and in particular FIGS. 1-4, the present humidified food warming cabinet 10 is formed from a cabinet 12 having wall(s) 36, a bottom 37, and a warming element 16 located inside the body of the cabinet 12, preferably near the bottom 37 of the cabinet 12. The warming element 16 is covered by a warming element cover 18 having vents 34. A tube 20, connected to a water line 24 located outside of the cabinet 12, enters through the wall 36 of the cabinet 12. The tube 20 has a spray nozzle 22 at one end of the tube 20 and in a first embodiment is positioned above the warming element cover 18. Proximate to the cabinet 12 is a source of water, in a first embodiment, a closable water reservoir 28. The closable water reservoir 28 can be positioned within the cabinet 12 on a platform 30 as shown in FIG. 2, or can be located outside of and adjacent to the cabinet 12.

A pump 32 connects the water reservoir 28 to the water line 24 running into the cabinet 12. While the present disclosure utilizes a water reservoir as the source of water, it is understood that source of water may be a direct source as well. A humidity and temperature controller 14 is present, along with humidity and temperature sensor(s) 26. The humidity and temperature sensor 26 of the present embodiment is a dual sensor; however, it is also anticipated that individual temperature and humidity sensors may be used. Similarly, the humidity and temperature controller 14 is a dual controller, however, it is anticipated that individual humidity and temperature controllers may be utilized with the present disclosure.

Figure 3:
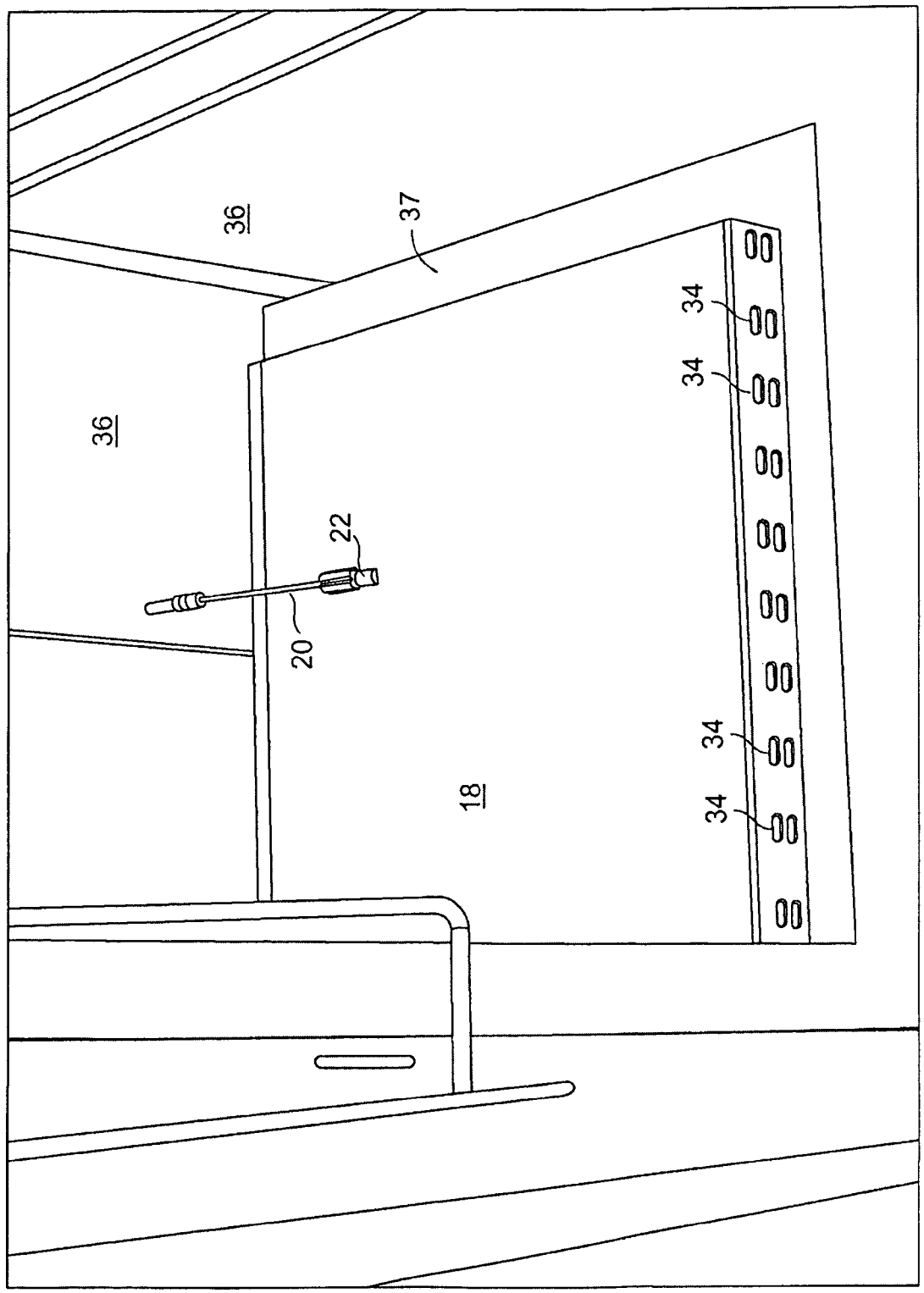
FIG. 3 is a perspective view of the interior of the food warming cabinet, illustrating the spray nozzle and warming element cover.
Figure 4:
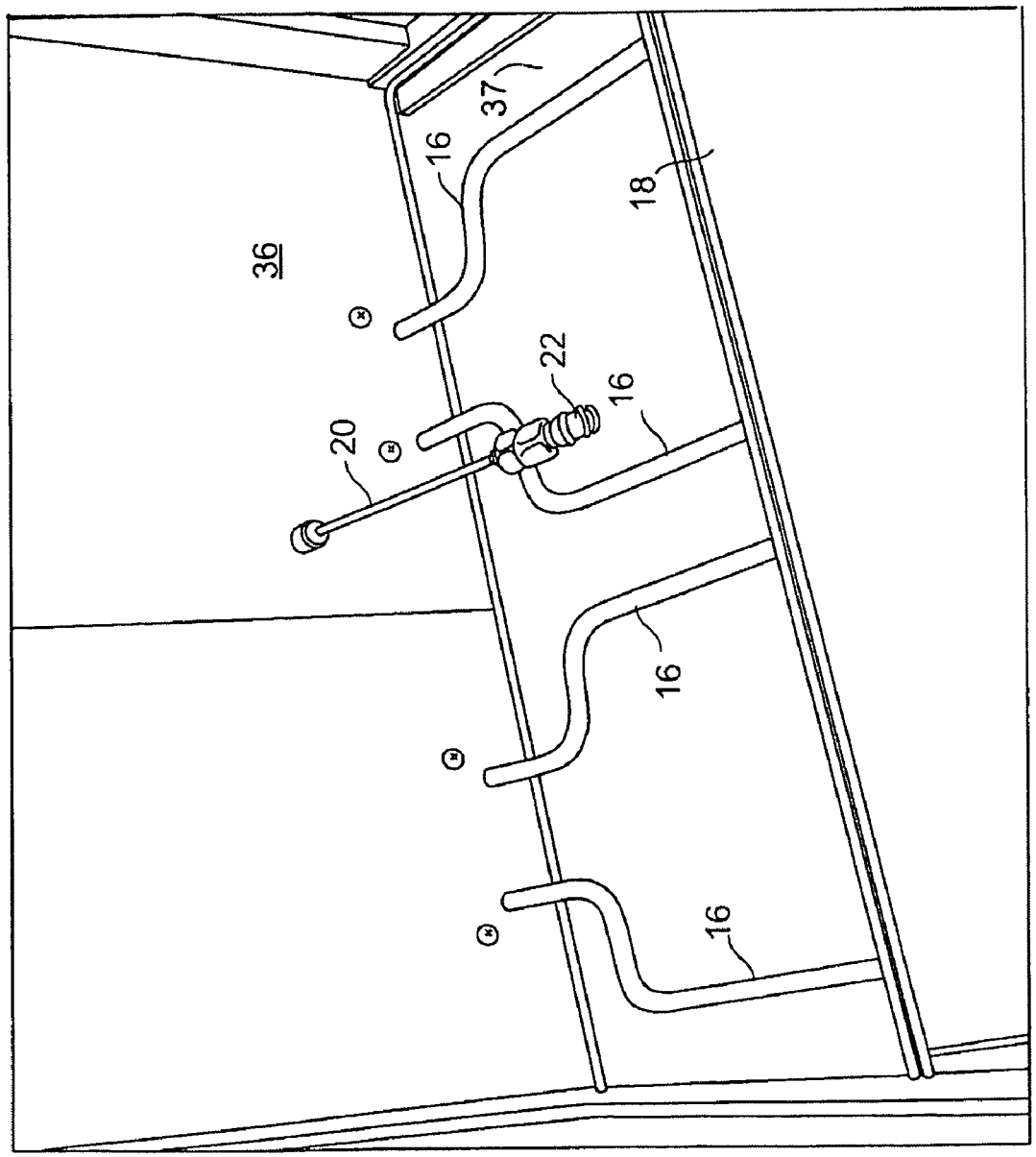
FIG. 4 is a perspective view of the warming element cover removed to show the warming elements below.

Turning to FIGS. 3 and 4, the warming cabinet 12 is, preferably, made of stainless steel and may be insulated. The warming cabinet 12 keeps food warm by operation of the warming element 16, located (in a present embodiment) at or near the bottom of the cabinet 12. Heat from the warming element 16 rises within the cabinet 12 to warm the cabinet 12 to a desired temperature as determined by the humidity and temperature controller 14. The warming element 16 is covered by a removable warming element cover 18 having vents 34. The warming element cover 18 vents 34 allow heat from the warming element 16 to escape from beneath the warming element cover 18 and warm the cabinet 12.

FIG. 4 shows the warming cabinet 12 with the warming element cover 18 partially removed, exposing the warming elements 16 located beneath the warming element cover 18. While warming element 16 is shown using electric coils, the warming element 16 may also include gas burners or other heating methods compatible with the present disclosure. In addition to heating the cabinet 12, the warming element 16 also acts to heat the warming element cover 18. The same warming element 16 is used to both warm the cabinet 12 and to heat the warming element cover 18, removing the need for a separate heating source to heat the water to form water vapor to humidify the cabinet 12. The warming element cover 18 may be made from any thermally-conductive material, including metals, ceramics, polymerics, and the like.

The humidified food warming cabinet 10 operates by sensing the temperature and humidity in the cabinet 12. A humidity and temperature sensor 26 senses the temperature in the cabinet 12 and signals the temperature controller. The temperature controller 14 determines whether the temperature in the cabinet 12 is at the desired temperature and regulates the status of the warming element 16 in response, turning the element on or off. A control panel 15 located on the cabinet 12 allows a user to set, modify, and manage the temperature and humidity levels of the cabinet 12.

Similarly, the humidity and temperature sensor 26 senses the humidity in the cabinet 12. When the humidity in the cabinet 12 falls below a pre-determined level, the temperature/humidity controller 14 signals the pump 32 to release an atomized water spray into the cabinet 12. The water is stored in a water reservoir 28 in a present embodiment. Water is pumped from the water reservoir 28 through the water line 24 and is sprayed through the nozzle 22 and onto the warming element cover 18. The warming element cover 18 is maintained at an elevated temperature from the warming element 16 below. Thus, when the sprayed, atomized water comes in contact with the warming element cover 18, the water vaporizes/evaporates quickly. While there may be a slight depression in the warming element cover 18 to prevent water droplets from rolling off the element cover 18 prior to evaporation, it is not intended that the water accumulate in the depression. The water vapor circulates throughout the cabinet 12, humidifying the cabinet 12. The amount or quantity of water sprayed may be regulated and controlled by the controller 14 based on the humidity level within the cabinet 12.

The warming element 16 and the water pump 32 work in conjunction with one another. If the humidifier/temperature controller 14 senses that the warming element 16 is not on or that the warming element cover is not at a temperature sufficient to evaporate the atomized water properly, no water is sprayed onto the warming element cover 18. In other words, the pump 32 will not release water onto the warming element cover 18 unless the warming element 16 is on. By only releasing water when the warming element 16 is on, the present cabinet 12 prevents water from accumulating on the warming element cover and forming a stagnant, open pool of water that might otherwise propagate the growth of bacteria, fungi, and viruses. Instead, in the present disclosure, the water comes in contact with the warming element cover 18 and quickly evaporates to humidify the air in the cabinet 12.

In an alternate embodiment, the cabinet 12 is configured to receive water from a city or local water supply. In such an embodiment, the pump 32 is replaced by a water pressure regulator. The humidity and temperature controller 14 signals the water pressure regulator to release a spray of water on to the warming element cover 18 in response to a signal from the humidity and temperature sensor 26 indicating that the humidity level in the cabinet is below a desired level. If the humidity and temperature controller 14 senses that the warming element 16 is not on or that the warming element cover 18 is not at a temperature sufficient to evaporate the water properly, no water is sprayed onto the warming element cover 18. In other words, the water pressure regulator will not release water onto the warming element cover 18 unless the warming element 16 is on. Because the water from the spray nozzle 22, which falls onto the warming element cover 18, evaporates almost immediately on contact with the warming element cover 18, there is no accumulation of water on the warming element cover 18, decreasing the opportunity for the growth of mold, bacteria, viruses or other water-born pathogens and helps prevent contamination of the food placed in the cabinet 12 for warming.

All patents referred to herein, are incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A humidified food warming apparatus, the apparatus comprising:
   a cabinet;
   a humidity sensor configured to measure a humidity level in the cabinet;
   a temperature sensor configured to measure a temperature level in the cabinet;
   a humidity and a temperature controller;
   a warming element configured to warm the cabinet, the warming element being a gas burner;
   a warming element cover adjacent to the warming element that has a top surface and at least two side surfaces, with the side surfaces having a plurality of openings; and
   a water dispensing device configured to controllably release a quantity of water onto the warming element cover when the humidity sensor senses that the humidity level within the cabinet has decreased and when the warming element cover is sufficiently warm to evaporate the quantity of water released onto the warming element cover,
   wherein the warming element cover is heated by the warming element.

2. The humidified food warming apparatus of claim 1, wherein the cabinet is an insulated, stainless steel cabinet having a quantity of shelves, the quantity of shelves configured to hold food.

3. The humidified food warming apparatus of claim 1, wherein the humidity sensor signals the humidity controller of the humidity level in the cabinet and the humidity controller determines the quantity of water to be released.

4. The humidified food warming apparatus of claim 1, wherein the temperature sensor signals the controller of the temperature level in the cabinet and the temperature controller determines whether to turn the warming element on or off.

5. The humidified food warming apparatus of claim 1, wherein the portion of water is not released unless the warming element is on.

6. The humidified food warming apparatus of claim 1, wherein the warming element cover is metal.

7. The humidified food warming apparatus of claim 1, wherein the warming element cover is ceramic.

8. The humidified food warming apparatus of claim 1, wherein the water dispensing device comprises a water retaining device, a water pump, and a tube.

9. The humidified food warming apparatus of claim 1, wherein the water dispensing device is comprised of a water pressure regulator and a tube.

10. The humidified food warming apparatus of claim 1, wherein the water dispensing device sprays the quantity of water into the cabinet.

11. The humidified food warming apparatus of claim 1, wherein the water dispensing device sprays the quantity of water into the cabinet, the quantity of water falls onto the warming element cover and the quantity of water is evaporated.

12. The humidified food warming apparatus of claim 1, wherein the water dispensing device sprays the quantity of water directly onto the warming element cover.

* * * * *